March 16, 1965   R. E. MOHLER   3,173,150
GLOVES AND METHODS OF CONSTRUCTION
Filed Jan. 14, 1963

INVENTOR.
RICHARD E. MOHLER
BY Watts & Fisher, attys.

3,173,150
GLOVES AND METHODS OF CONSTRUCTION
Richard E. Mohler, Coshocton, Ohio, assignor to
Edmont Inc.
Filed Jan. 14, 1963, Ser. No. 251,118
12 Claims. (Cl. 2—167)

This invention relates generally to new and improved clothing material, and more specifically to fluid-resistant insulated glove constructions and methods of making such gloves.

The preferred glove construction of the invention includes a novel, laminated glove liner comprising a layer of flexible, cellular foam material secured between an inner fabric lining and an outer fabric ply, and an elastomeric protective coating infused over the outer fabric ply on at least the palm portion of the glove. The foam material is preferably a polyurethane foam, while the elastomeric protective coating is a material selected to prevent liquid penetration into the foam insulation. The protective coating also may be selected to provide abrasion and cut resistance, heat resistance, and other desired properties for specific applications. As will become apparent, the materials and methods provided by this invention have applicability to many different glove designs, including mittens, as well as to other types of clothing, such as safety clothing, raincoats, boots, and the like.

The properties of many of the foam forms of polyurethane resins, particularly their light weight, high insulation value, and good flexibility, have been recognized as being highly desirable in many forms of clothing. This fact has been demonstrated by the recent rapid growth of the use of polyurethane foams as liners for coats and other wearing apparel. Polyurethane foams also have been used in making gloves suitable for handling hot and cold materials. However, heretofore there has been no known construction which includes, in addition to the insulating foam layer, a completely fluid-impervious outer skin or coating and an inner fabric lining.

Flexible polyurethane foams have a predominance of open cells which provide numerous air pockets, and for this reason the foam is characterized by a desirable low thermal conductivity. On the other hand, because of the predominance of open cells, the foam material inherently absorbs moisture. If moisture penetration is not prevented and the water concentration within the foam becomes high, the insulating value of the foam will be reduced due to the fact that water is a relatively good conductor.

In clothing applications involving contact with water, a water repellent fabric has been conventionally used as an outer material in an attempt to prevent moisture from entering the foam. Such a construction is not wholly satisfactory even in the case of rainwear, since the outer fabric is punctured in the seam areas during the sewing operations so that the water resistance in such areas is adversely affected.

The provision of a water repellent fabric is even less satisfactory in many glove applications, since any moisture penetration cannot be tolerated while retaining the insulating value and other desirable properties of the foam. Prior art techniques involving the formation of a continuous, water-impervious coating, as by dipping in a suitable plastisol or similar compound and then curing the compound, have not been used successfully prior to this invention in a construction which includes a foam insulating layer. This is because the plastisol or other compound will penetrate the foam during application in a manner similar to water so as to destroy the desired flexibility and insulating properties.

The foregoing problems have been overcome by the present invention through the provision of new and improved constructions in which the cells of the foam material on its surface are substantially closed to avoid penetration by the coating composition. In the preferred form of the invention generally described above, the surface closing of the cells is accomplished by the outer fabric ply of the novel, laminated liner. A suitable liquid coating is then applied to at least a portion of the fabric ply, as by dipping, and is cured to form a continuous, elastomeric protective coating which covers and is infused in the fabric.

Penetration of the coating material into the foam is prevented by the fabric. As a result, the laminated construction is rendered fluid resistant, while retaining the flexibility and insulating properties of the foam. Another advantage is that excellent adhesion of the coating material is achieved by using the fabric barrier. According to modified embodiments of the invention hereinafter described in detail, the cells of the foam material may be closed by providing a barrier film over the foam and by exposing the foam to heat so as to collapse the cells.

The invention also contemplates certain modified constructions and methods of formation which are particularly adaptable to specific glove applications. With the general construction described above, the elastomeric protective coating which forms the outer skin of the glove prevents outside moisture from coming into contact with the foam when placed in contact with water. In addition to this outside coating, a moisture-proof barrier film comprising a thin, plastic film may be provided between the inner fabric lining of the laminate and the inner surface of the insulating foam. This film has the advantage of preventing perspiration of the hand from coming into contact with the foam so as to destroy its insulating properties. According to another modification, the external, elastomeric protective coating is applied only to the palm and fingers of the glove. The back of the glove which is uncoated may be treated with a suitable water repellent material which permits air to pass through the foam. By making the back of the glove "breathable," perspiration within the glove is free to evaporate through the back which is the area least likely to come in contact with surface moisture under hand pressure. Although described specifically in connection with the manufacture of gloves, it will be understood that these modifications of the invention also are useful in making other forms of clothing.

A general object of the present invention is to provide a new and improved clothing material which is characterized by its fluid resistance, flexibility and insulating properties.

A more specific object of the invention is to provide material as described above which includes a layer of foam material and methods of manufacture whereby the foam is provided with a continuous, elastomeric protective coating.

Another object of the invention is to provide specific improvements in the manufacture of gloves which include the material and methods generally described above.

Other objects and advantages of the invention will become apparent from the following detailed description when taken in conjunction with the accompanying drawings.

Figure 1:
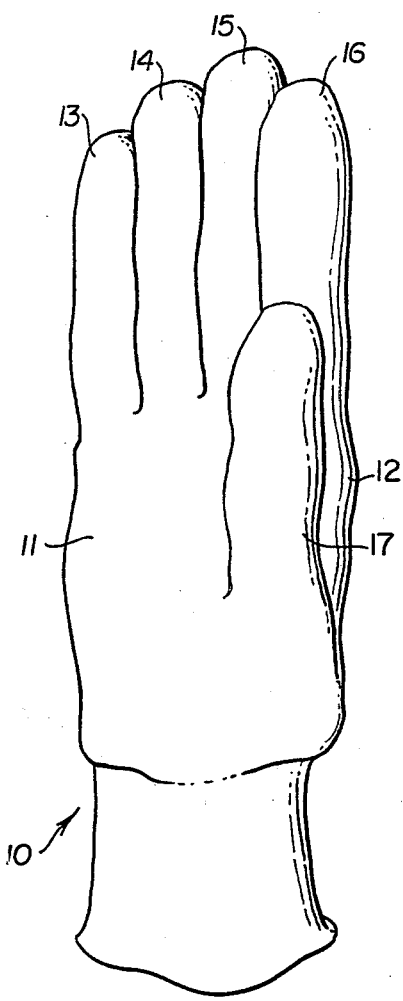
FIGURE 1 is a perspective view of a glove made in accordance with the preferred teachings of this invention.

Referring first to FIG. 1, there is shown a glove 10 formed in accordance with the present invention. The glove 10 includes a palm portion 11, a back portion 12, and finger stalls 13–17.

Figure 2:
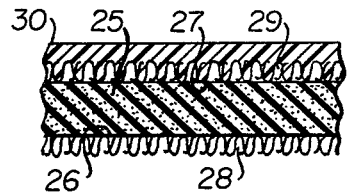
FIGURE 2 is a diagrammatical, sectional view showing a portion of the preferred glove material on an enlarged scale.

As shown in FIG. 2, the preferred laminated liner of the glove 10 comprises a layer of cellular foam material 25 having inner and outer surfaces which are generally designated by reference numerals 26 and 27, respectively. A fabric glove lining 28 is provided on the inner surface 26 of the foam material, and an outer fabric ply or covering 29 is secured over the outer surface 27. A fused-in-situ, elastomeric protective coating 30 is formed over the laminated liner and is infused in the outer fabric ply or covering 29 so as to form the outer skin of the glove 10. The outer fabric ply or covering 29 prevents the liquid elastomer used to form the coating 30 from penetrating into the foam so as to destroy its flexibility and insulating properties. The completed glove 10 is rendered completely water resistant by the protective coating 30 so that water and similar liquids cannot penetrate into the foam.

The material 25 preferably is a foamed synthetic resin which, in the illustrated example of the invention, is the foam form of one of the polyurethane resins. Those familiar with the use of plastic foams will recognize that various polyurethane resins may be used in the formation of flexible foams which exhibit good insulating properties, and, therefore, it is to be understood that any one of these resins may be selected for use in accordance with this invention. The fabric 28 and 29 either may be a woven or a knitted fabric, such as knitted jersey or the like.

The elastomeric protective coating 30 is formed of a settable composition selected to provide water resistance and other desired properties for specific applications. For example, in applications requiring high abrasion resistance, the coating 30 may be a fused plastisol, such as a plastisol consisting essentially of polyvinyl chloride and a plasticizer therefor. Gloves having fused plastisol coatings also offer good resistance to many chemicals. In other applications requiring resistance to cutting and solvent resistance to chemicals, the coating 30 may be formed of a suitable synthetic rubber, such as Neoprene or the like, or of a natural rubber latex.

In accordance with the preferred method of manufacturing the glove 10, the laminated liner material is first made in sheet form by bonding the fabric plies 28 and 29 to opposite surfaces of the foam layer 25. This may be accomplished by use of a suitable adhesive or by momentarily exposing the foam to an open flame and then bringing the foam into contact with the fabric while the foam is still tacky from the heat. The thickness of the foam layer can be varied depending upon the amount of insulation protection which is desired. By way of example, good protection has been obtained using foam having a thickness of about 3/32 of an inch.

The laminated sheet is then cut to produce the components of the glove. These components are sewed together to form the glove liner consisting of the foam layer 25, the inner fabric lining 28 and the fabric covering 29, and the liner is dipped into a quantity of the coating material. As explained above, penetration by the coating material into the foam layer 25 is prevented by the fabric barrier 29.

A typical formulation for a suitable plastisol coating compound is as follows:

| Material: | Parts by weight |
| --- | --- |
| PVC Resin | 100 |
| Plasticizer | 90–120 |
| Stabilizer | 2–4 |
| Pigments | 3 |

A suitable natural rubber dip formulation is as follows:

| Material: | Parts by weight |
| --- | --- |
| Sulphur | 1 |
| Zinc Oxide | 3 |
| Anti-oxidant | 1.5 |
| Accelerator | 1.5 |
| Pigments, stabilizer and thickeners | 5 |
| Natural Rubber Latex | 100 |

A suitable synthetic rubber dip formulation is as follows:

| Material: | Parts by weight |
| --- | --- |
| Neoprene Latex | 100 |
| Sulphur | .65 |
| Zinc Oxide | 3 |
| Stabilizer | .5 |
| Anti-oxidant | 1.3 |
| Accelerator | 3 |
| Pigment, thickeners and fillers | 5 |

Following the step of dipping in any one of the above compositions, the compositon is cured, as by the application of heat, to provide a continuous, elastomeric protective coating over the palm portion 11, the back portion 12 and the finger stalls 13–17 of the glove. As generally explained above, the fabric covering or barrier 29 prevents the dipping composition from penetrating into the foam and, in addition, achieves good adherence of the coating composition which is infused in the fabric covering 29.

Figure 3:
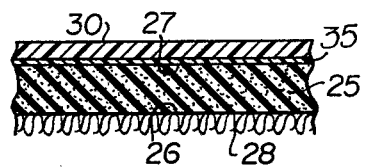
FIGURE 3 is a diagrammatical, cross-sectional view illustrating still another embodiment of the invention.

In the embodiment illustrated in FIG. 3, a barrier of a thin plastic film 35 is formed over the upper surface 27 of the foam 25 in place of the previously described fabric covering 29. The barrier film 35 may be formed of any suitable material which has an affinity for the foam and which will serve to close the cells on the outer surface 27. By way of example, the thin barrier film 35 may be commercial grade polyvinyl chloride approximately one to two mills in thickness. As will be recognized by those skilled in the art, polyvinyl chloride film is readily bonded to the foam by adhesive or by flame bonding. The elastomeric protective coating 30 may be formed over the film 35 by dip coating in the same manner as discussed in conjunction with the embodiment of FIG. 2.

Figure 4:
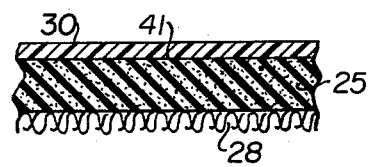
FIGURE 4 is a diagrammatical, cross-sectional view illustrating still another embodiment of the invention.

FIGURE 4 illustrates still another modification of the basic construction of FIG. 2 wherein the cells of the foam layer 25 are closed at its outer surface 41 to prevent penetration of the elastomeric protective coating 30. In this embodiment, the cells are closed by exposing the foam material in sheet form to a flame, whereby the cells are caused to collapse by the heat. The fabric for forming the inner lining 28 of the glove is secured to the opposite surface of the foam material as described above and the two-ply laminate is made into the liner. The outer protective coating 30 again may be applied by dipping the laminated liner in a suitable dipping compound.

Figure 5:
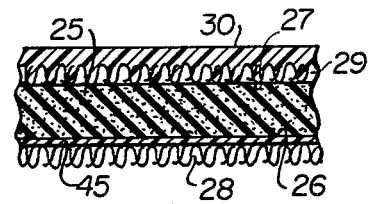
FIGURE 5 is a diagrammatical, sectional view illustrating still another embodiment of the invention.

Referring next to FIG. 5, there is shown a modification of the glove construction of FIGS. 1 and 2 wherein a thin plastic barrier film 45 is formed between the foam layer 25 and the fabric liner 28. This barrier film 45 may be similar to the film 35 in the embodiment of FIG. 3 and serves to close the cells of the foam on its inner surface 26 and thereby prevent the perspiration of the hand from coming in contact with the foam. Thus, the insulating efficiency of the foam in this construction will remain high in spite of excessive perspiration.

Figure 6:
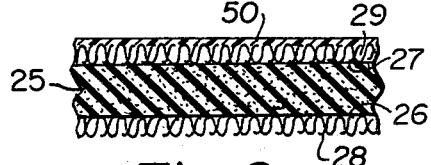
FIGURE 6 is a diagrammatical, sectional view illustrating yet another embodiment of the invention.

FIGURE 6 is a fragmentary view of the back portion of a so-called palm-coated glove construction. In this embodiment, the external protective coating 30, as shown in FIG. 2, is applied only to the palm and fingers of the glove. As shown in FIG. 6, the fabric 29 on the back of the glove is left uncoated and, instead, is treated with a water repellent material 50 which will permit air to pass through the foam insulation. A suitable water repellent material for this purpose is a silicone, such as SM-2013 silicone sold by the General Electric Company. By having the back of the glove "breathable," perspiration within the glove is free to evaporate through the back so as to maintain the high insulating value of the foam and to relieve the discomfort of accumulating moisture next to the hand.

As will be apparent from the foregoing, the invention provides in each embodiment a novel construction including a fabric lining and a layer of flexible, insulating foam which is covered on at least one surface with an elastomeric protective coating. The methods of construction are such that the elastomeric coating can be applied to the foam material and fused-in-situ without penetrating into the foam and destroying its advantageous properties.

Many other modifications and variations of the invention will be apparent to those skilled in the art in view of the foregoing detailed disclosure. Therefore, it is to be understood that, within the scope of the appended claims, the invention can be practiced otherwise than as specifically shown and described.

What is claimed is:

1. A laminated glove construction including a palm portion, a back portion, and finger stalls, said laminated construction comprising inner and outer fabric layers, said inner layer forming a glove lining, a layer of foam material between said fabric layers, said fabric and foam layers being in bonded connection throughout said glove to form a unitary structure wherein said foam layer is held against slippage relative to said fabric layers, and means forming an outer, water-repellant coating, said means including an elastomeric protective coating on at least the palm portion of said glove, said elastomeric coating being infused in said outer fabric layer.

2. The glove construction as claimed in claim 1 wherein said means further includes a water-repellent material on the back portion of said glove, said water-repellent material being air permeable.

3. The glove construction as claimed in claim 2 wherein said foam material comprises a foamed synthetic resin.

4. The glove construction as claimed in claim 3 wherein said elastomeric coating consists essentially of a fused plastisol.

5. The glove construction as claimed in claim 3 wherein said elastomeric coating consists essentially of rubber latex.

6. An article of manufacture comprising a portion of cellular foam material having first and second surfaces, a protective covering portion over at least part of said first surface, said protective covering consisting essentially of a fused-in-situ elastomeric composition, said foam material portion having its cells at said first surface substantially closed to prevent impregnation by said composition, a fabric portion over at least part of said second surface, and a moisture-impervious barrier portion between said fabric portion and said second surface, said portions being bonded together to form a unitary structure.

7. The article as claimed in claim 6 wherein said moisture-impervious barrier portion comprises a film coating bonded to said foam material portion.

8. A method of making a glove having a back portion, a palm portion and a finger stall including the steps of forming a laminated sheet comprising a layer of foam material having fabric bonded to opposite surfaces, making a glove liner from said laminated sheet, thereafter applying a fusible coating composition to the fabric on at least the palm portion of said glove liner, and curing said composition.

9. A bonded, laminated glove comprising:
(a) a fabric lining,
(b) an insulating layer of cellular foam material bonded over said lining,
(c) an outer protective coating bonded over said foam material on at least the palm portion of said glove,
(d) said protective coating consisting essentially of a fused-in-situ elastomeric composition,
(e) a barrier formed between said protective coating and the open cells of said material to prevent impregnation by said elastomeric composition.

10. The glove as claimed in claim 9 comprising:
(f) a moisture-impervious barrier between said lining and said foam material.

11. A laminated glove construction including a palm portion, a back portion, and finger stalls, said laminated construction comprising an inner fabric lining portion, an intermediate insulating portion of open, cellular foam material, means forming an outer, water-repellant portion for preventing water penetration into said foam material, said means including a fused-in-situ elastomeric coating composition on the palm portion of said glove, a barrier portion between said coating and the open cells of said foam material, and said portions being bonded together throughout said glove to form a unitary structure.

12. The glove as claimed in claim 11 wherein said barrier portion is a skin of collapsed cells on the surface of said foam material adjacent to said coating.

References Cited by the Examiner

UNITED STATES PATENTS

| | | |
|---|---|---|
| 668,919 | 2/01 | Hill et al. |
| 1,696,129 | 12/28 | Silver _____ 2—168 X |
| 2,121,678 | 6/38 | Armor. |
| 2,324,735 | 7/43 | Spanel. |
| 2,694,029 | 11/54 | Skinner _____ 2—168 X |
| 2,826,244 | 3/58 | Hurley. |
| 2,838,759 | 6/58 | Tassie _____ 2—167 |
| 2,981,954 | 5/61 | Garbellano. |
| 3,026,531 | 3/62 | Holaday _____ 2—167 |
| 3,053,725 | 9/62 | Uhleen _____ 156—278 |
| 3,117,045 | 1/64 | Schwickert _____ 156—278 |

FOREIGN PATENTS

| | | |
|---|---|---|
| 1,154,377 | 10/57 | France. |
| 811,997 | 4/59 | Great Britain. |

JORDAN FRANKLIN, *Primary Examiner.*

THOMAS J. HICKEY, *Examiner.*